United States Patent
Patton et al.

[11] Patent Number: 5,949,524
[45] Date of Patent: Sep. 7, 1999

[54] FILM SEGMENT PRINTING SYSTEM AND METHOD

[75] Inventors: David L. Patton, Webster; Daniel M. Pagano; Dale F. McIntyre, both of Honeoye Falls; Edward Weissberger, Pittsford, all of N.Y.

[73] Assignee: Eastman Kodak Company, Rochester, N.Y.

[21] Appl. No.: 08/897,171

[22] Filed: Jul. 18, 1997

[51] Int. Cl.[6] ............................ G03B 27/52; G03B 27/32; G03B 23/00
[52] U.S. Cl. ............................... 355/40; 355/27; 353/103
[58] Field of Search ............................ 355/27–29, 40–43, 355/72, 75; 353/103, 108, 104, 120, 113, 114, 116, 121, 122; 396/311

[56] References Cited

U.S. PATENT DOCUMENTS

| | | | |
|---|---|---|---|
| 3,290,987 | 12/1966 | James et al. | 353/26 R |
| 3,551,042 | 12/1970 | Brink et al. | 353/30 |
| 4,068,945 | 1/1978 | Spence-Bate | 355/54 |
| 4,083,631 | 4/1978 | Gugeler | 353/120 |
| 4,758,485 | 7/1988 | Drexler | 430/12 |
| 4,765,734 | 8/1988 | Truc et al. | 353/121 |
| 4,977,419 | 12/1990 | Wash et al. | 354/76 |
| 5,021,820 | 6/1991 | Robison et al. | 355/40 |
| 5,080,479 | 1/1992 | Rosenberg | 352/92 |
| 5,093,686 | 3/1992 | Shigaki | 355/77 |
| 5,187,923 | 2/1993 | Gerrans | 53/520 |
| 5,333,033 | 7/1994 | Blackman | 355/27 |
| 5,424,790 | 6/1995 | Tsunefuji et al. | 353/26 A |
| 5,436,682 | 7/1995 | Katoh et al. | 353/15 |
| 5,467,153 | 11/1995 | Fargeot | 353/103 |
| 5,485,232 | 1/1996 | Saito et al. | 352/5 |
| 5,521,663 | 5/1996 | Norris, III | 354/106 |
| 5,541,644 | 7/1996 | Nanba | 348/96 |
| 5,555,042 | 9/1996 | Jones et al. | 353/103 |
| 5,619,738 | 4/1997 | Petruchik et al. | 396/311 |
| 5,743,609 | 4/1998 | Bauer et al. | 353/25 |

FOREIGN PATENT DOCUMENTS

| | | |
|---|---|---|
| 173097 | 5/1986 | European Pat. Off. . |
| 261076 | 3/1988 | European Pat. Off. . |
| 2461276 | 1/1981 | France . |
| 3248279 | 6/1984 | Germany . |
| 373987 | 3/1991 | Japan . |

OTHER PUBLICATIONS

U.S. Patent Application Serial No. 08/775,326, entitled: "Film Slides Having Encoded Data and Methods for Preparing Film Slides", filed Dec. 31, 1996 by Dale F. McIntyre et al. (Copy not included).

*Primary Examiner*—Safet Metjahic
*Assistant Examiner*—Hung Henry Nguyen
*Attorney, Agent, or Firm*—Robert Luke Walker

[57] ABSTRACT

A system operates to handle and print images from a film slide having a first slide mount and a film segment mounted therein. The system includes a film segment extractor, a scanner, a printer, and a film segment mounter. The extractor extracts the film segment from the first slide mount of the film slide. The scanner scans image data from the film segment. Digital scanning may be performed by a digitizer. The printer prints an image from the scanned image data either optically or digitally. The film segment mounter mounts the film segment into a second slide mount as a second film slide. The second slide mount may be a new slide mount, or may be the original slide mount which is being reused. Magnetically encoded information stored on magnetic material disposed on the first slide mount and/or the film slide is read by respective magnetic readers. The information is then written on magnetic material disposed on the film segment and/or the second slide mount after printing from the film segment.

22 Claims, 4 Drawing Sheets

FILM SEGMENT PRINTING SYSTEM AND METHOD

CROSS REFERENCE TO RELATED APPLICATIONS

Reference is made to commonly assigned co-pending U.S. patent applications Ser. No. 08/775,677, entitled: METHOD AND APPARATUS FOR PREPARING PHOTOGRAPHIC FILM UNITS HAVING IMAGE FRAME ASSOCIATED ENCODED INFORMATION, and filed in the names of Richard Bauer, Dale McIntyre, Daniel Pagano, David Patton, and Edward Weissberger; Ser. No. 08/775,326, entitled: FILM SLIDES HAVING ENCODED DATA AND METHODS FOR PREPARING FILM SLIDES, and filed in the names of Dale McIntyre, Daniel Pagano, David Patton, and Edward Weissberger; Ser. No. 08/775,814, entitled: FILM SLIDES HAVING DATA WINDOWS, and filed in the names of Dale McIntyre, Daniel Pagano, David Patton, and Edward Weissberger; Ser. No. 08/775,327, entitled: ORIENTING PROJECTOR, and filed in the names of Dale McIntyre, Daniel Pagano, David Patton, and Edward Weissberger; Ser. No. 08/775,816, entitled: FORMATTING PROJECTOR, and filed in the names of Dale McIntyre, Daniel Pagano, David Patton, and Edward Weissberger; Ser. No. 08/775,847, entitled: ANNOTATION DISPLAYING PROJECTOR, and filed in the names of Dale McIntyre, Daniel Pagano, David Patton, and Edward Weissberger; Ser. No. 08/896,841. entitled: FILM SLIDE AND FILM EXTRACTOR, and filed in the names of Daniel Pagano, Dale McIntyre, David Patton, and Edward Weissberger; Ser. No. 08/896,374 entitled: FILM ORIENTING SLIDE MOUNTER AND METHOD, and filed in the names of David Patton, Daniel Pagano, Dale McIntyre, and Edward Weissberger; Ser. No. 08/879,169 entitled: DEFINED ORIENTATION SLIDE PROJECTOR AND SLIDES, and filed in the names of Daniel Pagano, David Patton, Dale McIntyre, and Edward Weissberger; Ser. No. 08/861,844 entitled: SLIDE WITH MAGNETIC MARKS THAT CAN BE READ BY MULTIPLE HEADS, and filed in the names of Dale McIntyre, Daniel Pagano, David Patton, and Edward Weissberger; each of which are assigned to the assignee of this application.

FIELD OF THE INVENTION

This invention relates to photography and equipment for handling film mounted in a slide mount, and more particularly relates to a method and apparatus for removing the film from a slide mount and decoding information stored on the slide mount and/or the film itself and using the decoded information for printing the film either optically or digitally.

BACKGROUND OF THE INVENTION

In the prior art, film segments storing images are mounted to slide mounts to form a slide. In this configuration, the film segments may be readily manipulated by handling the slide mount; for example, in transport and in positioning the film segment for imaging.

When optically or digitally printing from film mounted in a slide mount, several difficulties may be encountered. For example, the area to be printed or scanned for printing may have to be cropped to account for the space taken up physically by the slide mount. In performing cropping, a spacing tolerance is to be used to take into account the location of the film and the image on the film area with respect to the dimensions of the slide mount.

A second problem encountered in the prior art occurs when the film is held flat for scanning or printing. The presence of the slide mount retaining the film may interfere with such scanning or printing, and so the operations of scanning and printing must be modified to compensate for the slide mount to prevent such interference.

Another problem encountered in the prior art arises when the slide mount is damaged or worn away through use. The film segment may store information thereupon, for example, using magnetic strips with magnetically encoded information, or a magnetic coating on the film segment itself. In preparing the slide, the information may be read from the film segment, and then encoded on the slide mount, which is to be subsequently decoded and used during a scanning, printing, or viewing operation. Damage or wear of the slide mount may damage the information thereon, thus making the information inaccessible or even lost with respect to the slide mount. Without such information, it may be difficult or impossible to conduct the scanning, printing, or viewing operation.

Another problem is the lack of adaptability of prior art slides for allowing the digital mixing of information and images from the slides.

Accordingly, a need exists for a system for and method of compensating for the space taken up physically by the slide mount in performing printing from the slide during a cropping operation. In addition, a need exists for preventing the slide mount from physically interfering with scanning or printing from the film. Also, a need exists for a slide which is less susceptible to a loss of information encoded on the associated slide mount due to damage or wear of the slide mount. Further, a need exists for a slide which allows the digital mixing of information and images from the slide for subsequent printing therefrom.

SUMMARY OF THE INVENTION

It is an object of the present invention to provide a system and method which removes film from slide mounts and which handles such removed film for scanning, printing, or re-encoding information onto slide mounts.

It is also an object of the present invention to provide a method for printing film that has been previously mounted in a slide, in which the method easily removes the film prior to scanning for such printing or prior to printing. The removal of the film from the slide mount reduces or eliminates the need for cropping the area to be scanned or printed, and allows the film to be easily held flat for improved scanning or printing.

A further object of the present invention is to permit access to the information that was originally encoded on the film and which was subsequently read and recorded on the slide mount.

Another object of the present invention is to provide a method for reading and rewriting the information that was originally encoded on the film back onto the slide mount.

A still further object of the present invention is to provide a method for encoding new or additional information onto the unmounted film and then recording the information onto the slide mount.

An additional object of the present invention is to provide a method for easily remounting the film into a slide mount after scanning for printing or after printing, and reading and re-recording the information, or recording new information onto the film and/or slide mount.

In an illustrative embodiment of the present invention, a system and method are disclosed which handle and print images from a film slide having a first slide mount and a film segment mounted therein. The system includes a plurality of stations including a slide mount magnetic reader, a film segment extractor, a magnetic film reader, a fat bit reader, a scanner, a printer, a magnetic film writer, a film segment mounter, and a slide mount writer. The extractor extracts the film segment from the slide mount of the slide. The scanner scans image data from the film segment, either optically or digitally using a digitizer. The printer prints an image from the scanned image data either optically or digitally. The film segment mounter mounts the film segment into a slide mount to again form a slide. The slide mount may be a new slide mount, or may be the reused original slide mount. Magnetically encoded information stored on magnetic material disposed on the slide mount and/or the film segment is read by respective magnetic readers. A fat bit is also read by a fat bit reader. Such information read from the slide mount and/or the film segment, including the fat bit data, is used during the scanning operation and/or the printing operations. The information is then written on magnetic material disposed on the film segment and/or the slide mount.

The system and method remove the film from a slide mount to avoid the problem of the slide mount physically taking up space in scanning or printing the film, such as during a cropping operation. Such removal prevents the slide mount from physically interfering with scanning or printing of the film. Also, in removing the film and accessing information stored thereon, the system and method remedy the loss of information stored on the slide mount due to damage or wear of the slide mount.

BRIEF DESCRIPTION OF THE DRAWINGS

The features and advantages of the present invention will be readily apparent, and are to be understood, by referring to the following detailed description of the preferred embodiments of the present invention, taken in conjunction with the accompanying drawings, in which.

DETAILED DESCRIPTION OF THE INVENTION

Referring in specific detail to the drawings, with common reference numbers identifying similar or identical elements, steps, and features, as shown in FIGS. 1–5, the present invention is directed to a system 10 and method, respectively, for handling film slides. Generally, at various stages, stations, and steps of the disclosed system 10 and method, data encoded on the slide mount is read, a film segment is removed from the slide mount, data encoded on the film segment is then read, and the film segment is scanned. Printing from the film segment may then be performed optically and/or digitally, and updated information is recorded onto the film segment. The film segment is then remounted in the film slide, with data re-recorded onto the slide mount, and the remounted film slide is then placed into a stack of film slides.

Figure 1:
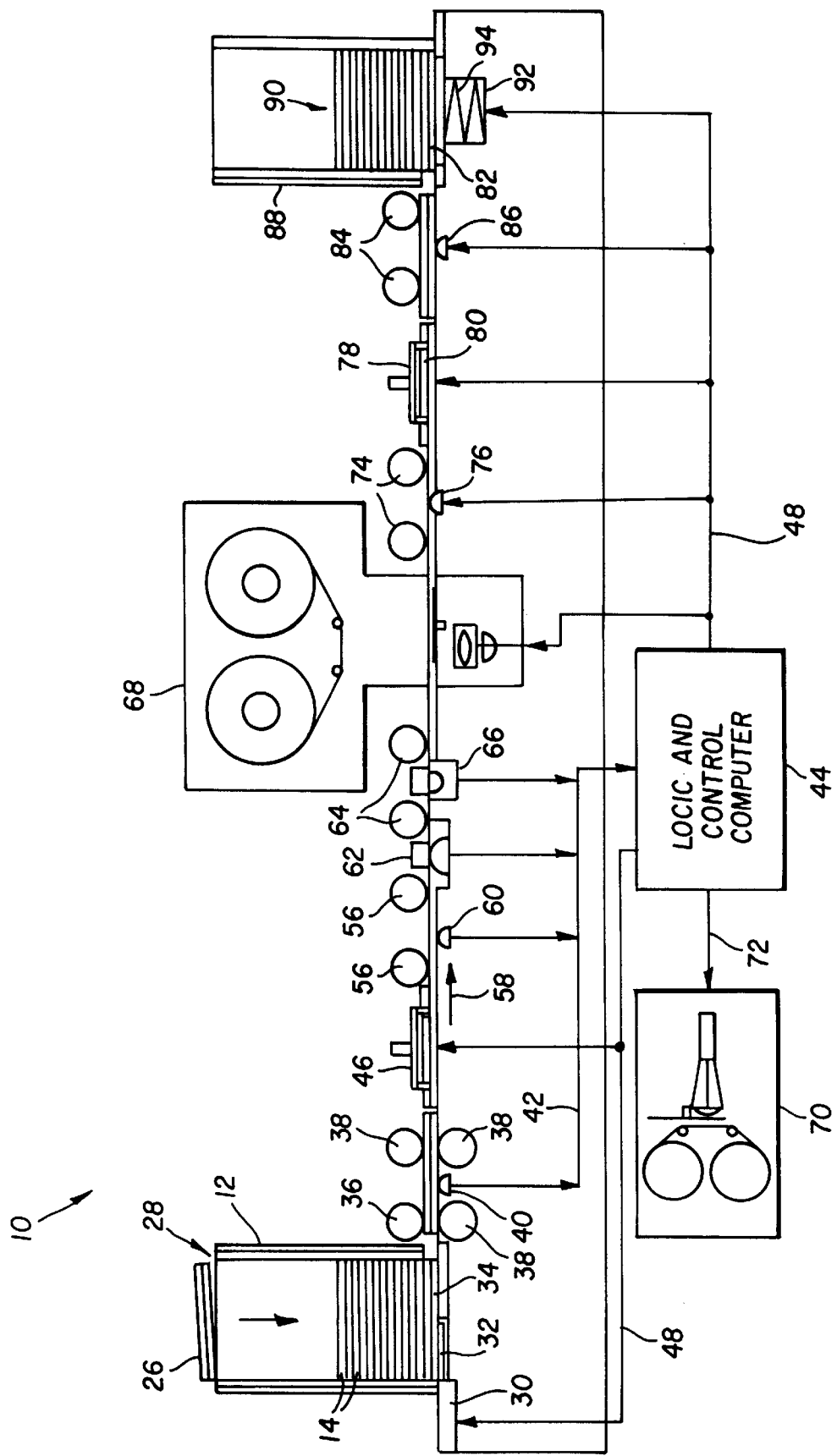
FIG. 1 is a schematic of the disclosed system for handling slides.
Figure 4:
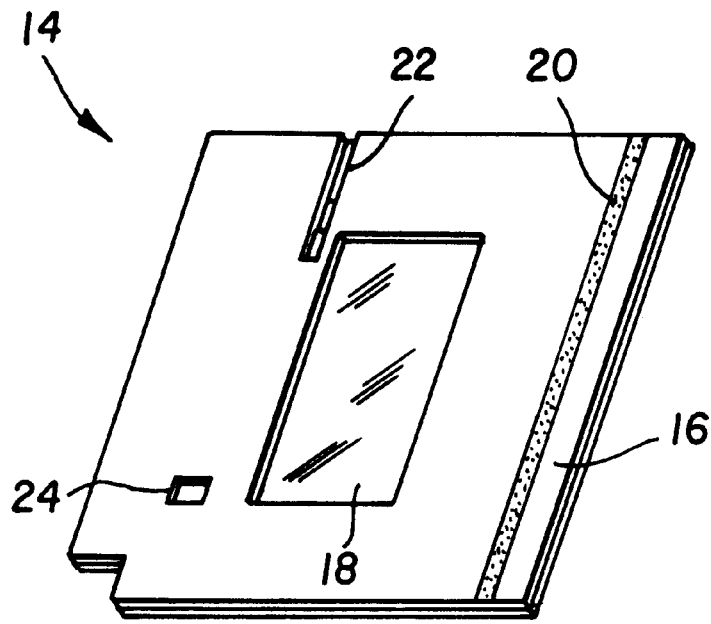
FIG. 4 is an example of a film slide which is adapted for film extraction.

Referring to FIG. 1, the disclosed system 10 includes a first slide holder 12 for stacking a stack of film slides 14. Each film slide 14 in the stack may be configured as shown in FIG. 4 to include a slide mount 16 having a film segment 18 mounted therein and a predetermined region or strip of magnetic material 20. Alternatively, the entire slide mount 16 and/or the entire film segment 18 may be composed of or coated with a magnetic material, with the predetermined region 20 of the slide mount 16 being at predetermined locations on the slide mount 16, such that information is only stored in such predetermined locations.

The slide mount 16 may include a cavity configured to retain an "Advanced Photographic System" (APS) film segment. Alternatively, any other size film such as 35 mm film may be positioned in the cavity. The use of film segments having magnetic material appropriately disposed thereon, such as APS film segments having a registration located at a predetermined distance from an edge of the APS film segment and the photographic image on the film segment, causes the film segments to be readily written upon magnetically by a magnetic writing head as described below.

The film slides may have a construction including an extraction slot 22 and a locking aperture 24 such as described in commonly assigned U.S. patent application Ser. No. 08/896,841 entitled: FILM SLIDE AND FILM EXTRACTOR, and filed in the names of Daniel Pagano, Dale McIntyre, David Patton, and Edward Weissberger; which is incorporated herein by reference. The film segments may be constructed such as described in U.S. patent application Ser. No. 08/896,844 entitled: SLIDE WITH MAGNETIC MARKS THAT CAN BE READ BY MULTIPLE HEADS, and filed in the names of Dale McIntyre, Daniel Pagano, David Patton, and Edward Weissberger; which is incorporated herein by reference.

Additional film slides 26 may be added to the stack through an opening 28 in the first slide holder 12. In the illustrative embodiment shown in FIG. 1, the opening 28 may be disposed at a top portion of the first slide holder 12, with the first slide holder 12 being an elongated hollow cylindrical structure having a rectangular cross-section dimensioned to substantially fit each of the plurality of film slides 14 therein.

A mounted slide feeder 30 may include a plunger or arm 32 which is cyclically moved in a back-and-forth manner between predetermined positions in a plane by a feeder motor (not shown in FIG. 1). The film slides 14 are consecutively removed from the bottom of the stack by the mounted slide feeder 30 using the plunger 32, which moves the fed slides, such as a first film slide 34, along a predetermined path into a first driver assembly 36 and a second driver assembly 38. In the illustrative embodiment of FIG. 1, each of the driver assemblies 36 and 38 includes upper mounted slide rollers and lower mounted slide rollers, with the rollers mounted to rotate about axles (not shown in FIG. 1) to move the first film slide 34 in a predetermined path between the driver assemblies 36 and 38.

As shown in FIG. 1, the driver assemblies 36 and 38 move the fed slide substantially adjacent to a first magnetic reader or head 40 for reading the data written on the magnetic region 20 of the slide mount 16. The data is sent via an input data bus 42, which may be input lines or cables, to a logic and control computer 44.

The fed slide, being a first slide mount 16 and a film segment 18 mounted therein, is then moved by the driver assemblies 36 and 38 to a film segment extractor 46 which extracts the film segment 18 from the first slide mount 16. The film segment extractor 46 may be constructed as described in commonly assigned U.S. patent application Ser. No. 08/896,841 entitled: FILM SLIDE AND FILM EXTRACTOR, and filed in the names of Daniel Pagano, Dale McIntyre, David Patton, and Edward Weissberger, which is incorporated herein by reference. In particular, the film slide 14 may be configured with the extraction slot 22 and the locking aperture 24 for use by the film segment extractor 46, as described in the incorporated patent application. The driver assemblies 36 and 38 may be incorporated into or operate in conjunction with a slide positioner apparatus, as described in the incorporated patent application. In addition, the logic and control computer 44 may incorporate or may operate in conjunction with the processor of the film segment extractor 46, with control signals sent to the film segment extractor 46 via an output data bus 48.

Figure 5:
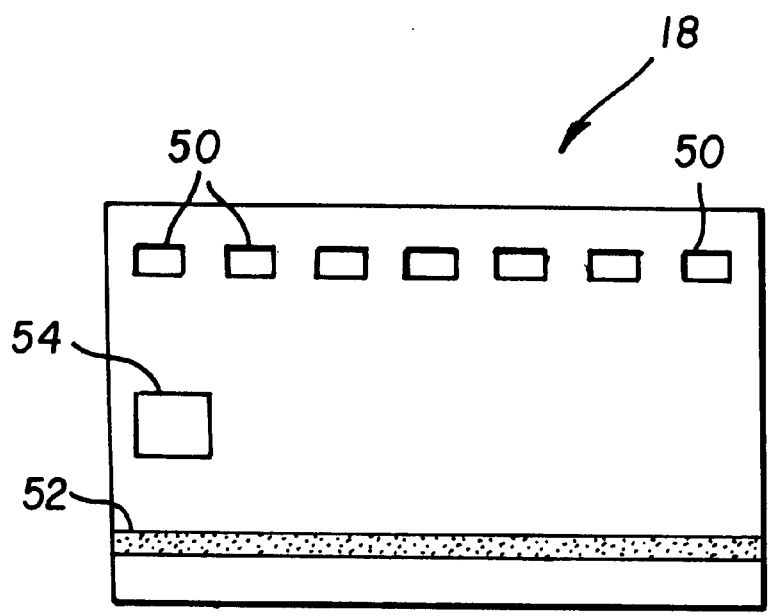
FIG. 5 is an example of a film segment.

The extracted film segment 18 may be configured as shown in FIG. 5, with the film segment 18 including a plurality of perforations 50, and a region or strip 52 of magnetic material for storing data thereon. Alternatively, the entire slide mount 16 and/or the entire film segment 18 may be composed of, or coated with, a magnetic material, with the predetermined magnetic region 52 of the film segment 18 being at predetermined locations on the film segment 18, such that information is only stored in such predetermined locations.

In addition, a predetermined region 54 of the film segment 18 may be utilized to store an optically coded bit for providing additional information about the images stored on the film, such as a format for printing the image. The predetermined region 54 may be a specific location configured, for example, in a square, and implemented optically by, for example, a light emitting diode (LED) to create a spot or region of relatively increased density. The predetermined region 54 may be called a "fat" data region, for example, due to the relative size and configuration of the region 54, for storing the bit as a "fat" bit. An optical sensor scanning the film segment 18 may readily locate the fat bit of the film segment 18 at the predetermined region 54 due to the different optical characteristics of the region 54 and may optically generate the fat bit.

The extracted film segment 18 is next moved by a third driver assembly 56, as shown in FIG. 1, in the direction indicated by the arrow 58 to be positioned substantially adjacent to a fat bit reader 60, such that the fat bit stored in the predetermined region 54 optically encoded on the film segment 18 may be read and decoded therefrom. The data corresponding to the fat bit is then sent to the logic and control computer 44 via the input data bus 42. The extracted film segment 18 is then moved by a third driver assembly 56 to be positioned substantially adjacent to a second magnetic reader or head 62, such that data stored on the magnetic region 52 of the film segment 18 may be read therefrom. The data which has been read by the magnetic reader 62 is then sent to the logic and control computer 44 via the input data bus 42.

The data read from the film segment 18 may include information for facilitating the digital mixing and printing of the images on the film segment 18 by a digital printer 70, as described below. For example, such information may be used by a professional film developer for changing the backgrounds to be processed with foreground images of, for example, people posing for portraits such as children. In addition, the information may be used for digital printing to specify filtering parameters so that, for example, shades of lighting may be modified, and the quality of the digital print may be improved, such as for the removal of scratches on the film segment.

Further, the information stored on the film segment 18 may include digital copyright data and/or digital watermarks which may be used to authenticate images and prints digitally generated therefrom. Also, microscopic forms of the images may be digitized and stored magnetically on the film segment 18 for data checking of the images during digital printing to provide a form of error correction coding, and/or to perform authentication functions for images digitally printed from the film segment 18.

The extracted film segment 18, being unmounted from the first slide mount 16, is then moved by a fourth driver assembly 64 to be positioned in a film scanner 66 so that the film segment 18 may be scanned, without the first slide mount 16, for various film characteristics, such as the color and density of the images stored thereon. The film scanner 66 may also digitize the images stored on the film segment 18. The data generated from the scanning operation, representing the film characteristics and/or the digitized images, is then sent to the logic and control computer 44 via the input data bus 42.

The extracted film segment 18 is then sent from the film scanner 66 to a printer. In one embodiment, the printer may be an optical printer 68 for generating and outputting an optical print therefrom via an imaging operation known in the art. Alternative to, or in conjunction with, being an optical printer 68, the printer may be a digital printer 70. As a digital printer 70, the printer may use the digitized image data received from the film scanner 66, directly therefrom or via output line 72 from the logic and control computer 44, to generate and output a digital image. The output line 72 may be incorporated into the output data bus 42.

The extracted film segment 18 is then moved by a fifth driver assembly 74 to be substantially adjacent to a magnetic writer 76 for magnetically writing and/or encoding information on the magnetic region 52 of the film segment 18. Such information is provided by the logic and control computer 44 via the output data bus 48. The extracted film segment 18, being unmounted, is then transferred by the fifth driver assembly 74 to a slide film mounter 78 for mounting the film segment 18 into a second slide mount 80; for example, the slide film mounter 78 may be the mounting system described in U.S. patent application Ser. No. 08/896,374 entitled: FILM ORIENTING SLIDE MOUNTER AND METHOD, and filed in the names of David Patton, Daniel Pagano, Dale McIntyre, and Edward Weissberger; which is incorporated herein by reference.

The second slide mount 80 may be a brand new slide mount, fed automatically by a slide mount feeder from a stack of empty slide mounts (not shown in FIG. 1), or the second slide mount 80 may be the first slide mount 16.

The first slide mount 16 may be reused if it is undamaged or not substantially worn by use. An operator may visually inspect the first slide mount 16 to classify it as reusable or non-reusable. Alternatively, automated visual classification techniques known in the art may be used, such as trained neural networks, which receive camera images of the first slide mount 16 to determine the degree of reusability, and which reject any slide mounts with reusability degrees below a predetermined threshold, such as 90% reusable rating out of 100%. Other methods may be used, such as artificial intelligence methods known in the art, for determining the reusability of the first slide mount 16 with respect to damage, wear, and other factors which would impair the reusability of the first slide mount 16 for remounting of the film segment 18.

Once the film segment 18 is remounted in the second slide mount 80 as a second film slide 82, a sixth driver assembly 84 passes the second film slide 82 substantially near a magnetic writer 86 to write and/or encode data onto the magnetic region of the second slide mount 80, such as the magnetic region 20 shown in FIG. 4. Such data may be the same data as written to the magnetic region 52 of the film segment 18 by the magnetic writer 76. Alternatively, the logic and control computer 44 may write different or additional information to the magnetic region 20 of the second slide mount 80.

The sixth driver assembly 84 outputs the second film slide 82. The system 10 may also include a second film slide holder 88 for storing a stack of remounted second film slides 90. The second film slide holder 90 may include an elongated hollow cylindrical structure having a rectangular cross-section dimensioned to substantially fit each of the plurality of film slides therein. The second film slide holder 88 may also include a film slide loader 92 including, for example, a controlled spring device 94 or any such similar device such as an air cylinder, piston, solenoid, etc., which loads the second film slide 82 into the stack of remounted second film slides 90.

The logic and control computer 44 may perform as a central processing unit (CPU) of the disclosed system 10 and also in conjunction with other computing systems. For example, the logic and control computer 44 may be or may include a commercially available microprocessor and/or a microcontroller, such as the MC68HCO5 microcontroller available from "MOTOROLA". By executing predetermined software and/or firmware routines, the logic and control computer 44 may operate the disclosed system 10 as an automated system with high accuracy and high processing rates for high volume film processing applications. The logic and control computer 44 generates and directs outputted control signals on the output data bus 48 to any one or combinations of the components 30, 46, 68, 76, 80, 86, and 94. In this manner, the system 10 may be controlled by predetermined software and/or firmware implemented by the logic and control computer 44. Such control may be used by the system 10 to automatically handle a plurality of film slides 14.

In addition, the control of each of the stations and components of the system 10 may be coordinated by the control signals such that the operation of each of the components may be performed repeatedly and cyclically to handle a series of slides, with the various stations and components timed to operate on a successive slide after finishing operation on a current slide. Such control may be used to automatically and rapidly handle and print from a great number of slides with relative high accuracy.

Figure 2:
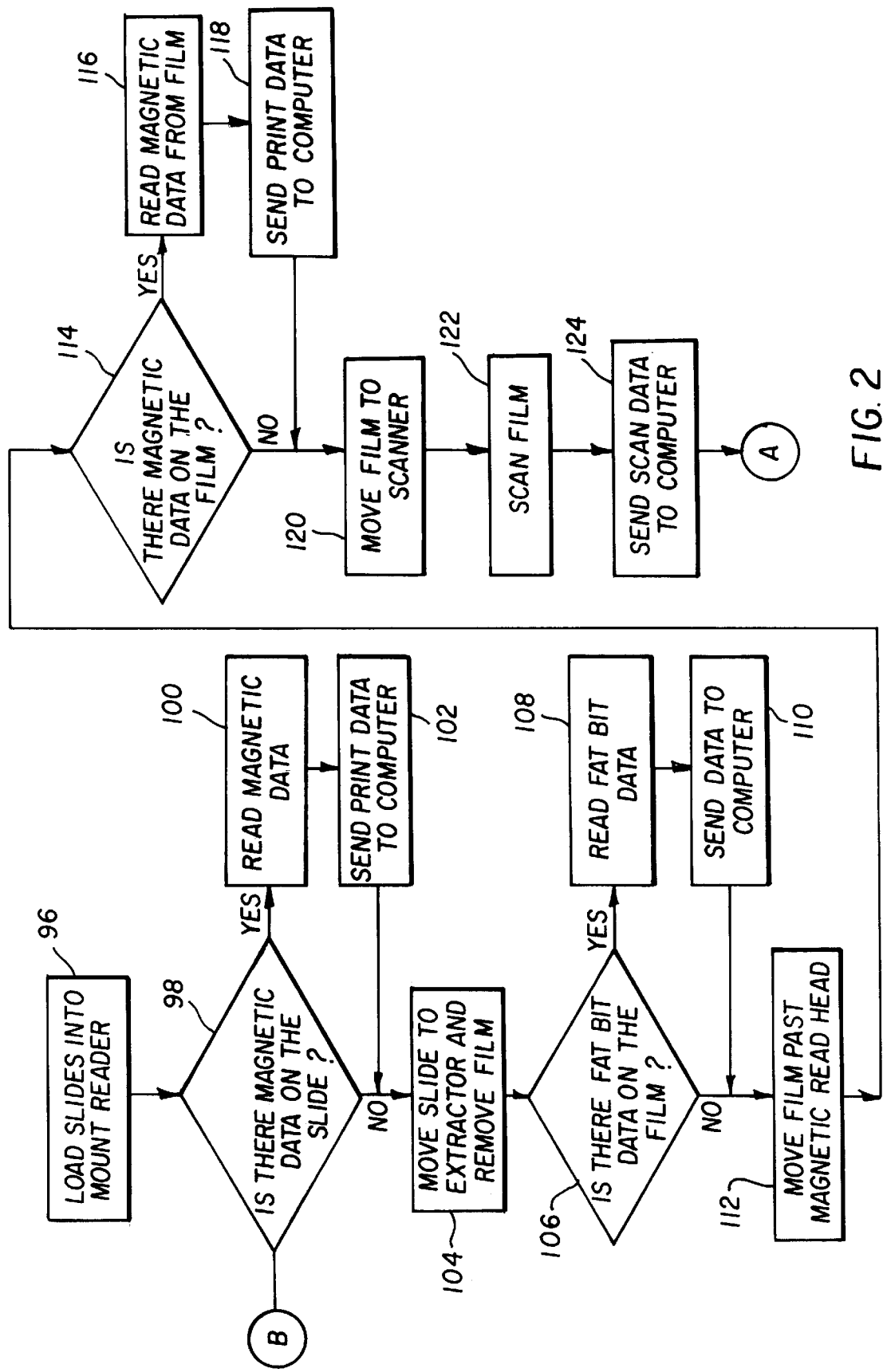
FIGS. 2-3 are flowcharts of the disclosed method for operating the disclosed system of FIG. 1.
Figure 3:
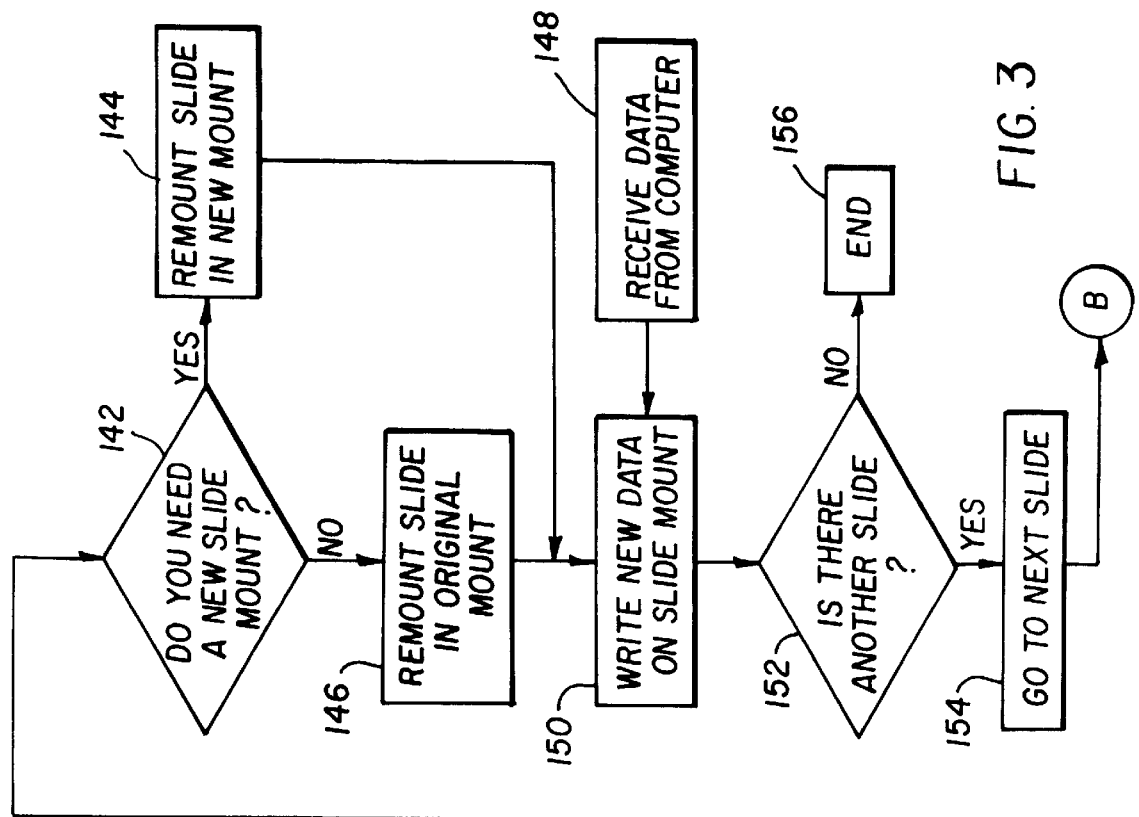
Figure 3:
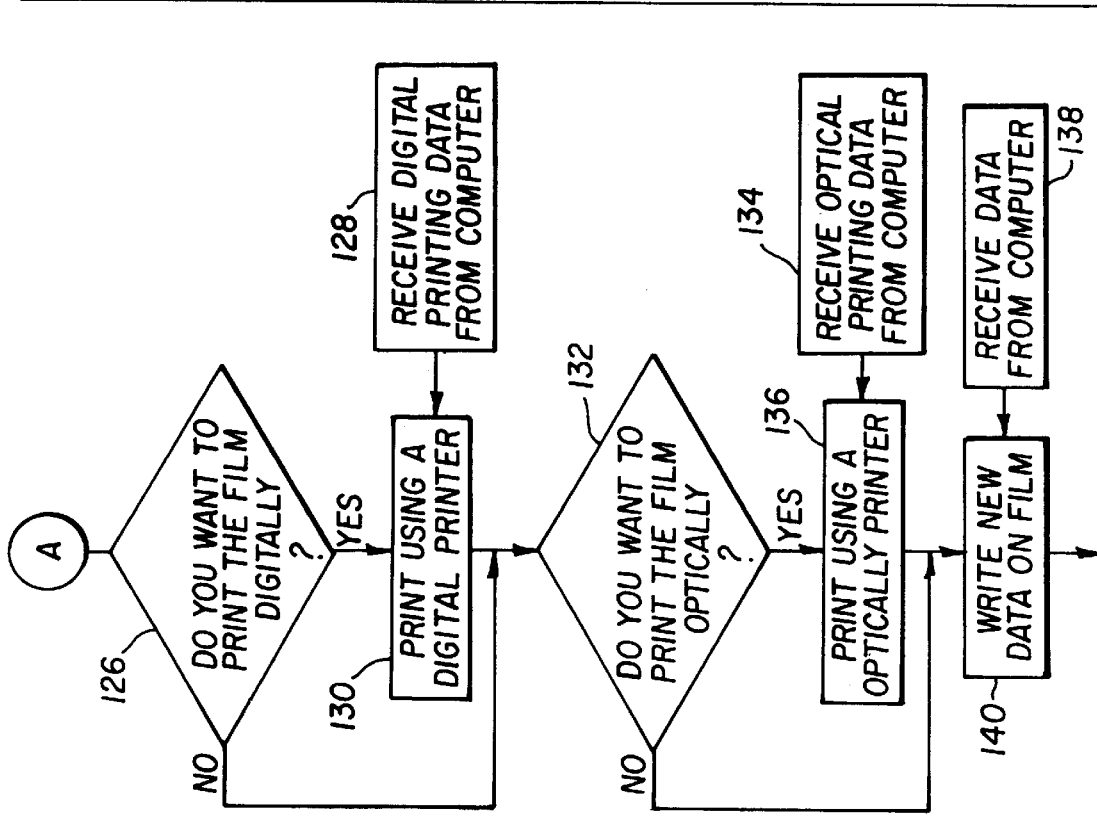

As shown in FIGS. 2 and 3, the disclosed method operates the disclosed system 10 using the steps of: loading or feeding (96) each of the film slides 14 from the first slide holder 12 using the mounted slide feeder 30; detecting (98) if there is magnetic data on a fed slide using the first magnetic reader 40; reading (100) the magnetic data using the first magnetic reader 40; sending the read data to the logic and control computer 44 in step (102); and proceeding to step (104). If no magnetic data is detected in step (98), the method proceeds directly to step (104).

In step (104), the method moves the slide with the driver assemblies 36 and 38 to the film segment extractor 46 which extracts the film segment 18 from the first slide mount 16. The method then detects if there is a fat bit on the film segment 18 in step (106) by positioning the film segment 18 substantially adjacent to a fat bit reader 60, such that the fat bit stored in the predetermined region 54 encoded on the film segment 18 may be read therefrom in step (108). If there is a fat bit, the method then sends such fat bit data to the logic and control computer 44 via the input data bus 42 in step (110), and the method then proceeds to step (112). If there is no fat bit detected in step (106), the method proceeds directly to step (112).

In step (112), the method then moves the extracted film segment 18 using the third driver assembly 56 so it is positioned substantially adjacent to the second magnetic reader 62, which is used in step (114) to detect if there is magnetic data on the film segment 18. If there is data, the method reads the data from the magnetic region 52 of the film segment 18 in step (116), sends the data to the logic and control computer 44 via the input data bus 42 in step (118), and proceeds to step (120). However, if no data is detected in step (114), the method proceeds directly to step (120).

In step (120), the method then moves the extracted film segment 18 using a fourth driver assembly 64 to a position in a film scanner 66 so that the film segment 18 may be scanned in step (122). The scanned data, including various film characteristics, such as the color and density of the images stored thereon, is then sent to the logic and control computer 44 in step (124). The step (124) may also include the steps of digitizing the images stored on the film segment 18, and sending the digitized image data to the logic and control computer 44 via the input data bus 42.

The method then determines, by default operating settings or from user input settings, whether to digitally print images using the digital printer 70 in step (126). If so, the method receives the digitized image data from the film scanner 66, either directly therefrom or via the output line 72 from the logic and control computer 44 in step (128), prints the digital image using the digital printer 70 in step (130), and proceeds to step (132). If digital printing is not set in step (126), the method proceeds directly to step(132).

In step (132), the method determines whether to perform optical printing from the film segment 18. If so, the method receives optical printing data from the film scanner 66, either directly therefrom or via the output data bus 48 from the logic and control computer 44 in step (134), prints the image using the optical printer 68 in step (136), and proceeds to step (140). If optical printing is not set in step (132), the method proceeds directly to step (140).

In proceeding to step (140), or prior to executing step (140), the method receives data from the logic and control computer 44 in step (138) which was previously read from the film segment 18 in step (114) and/or data from another source, such as the user annotating the film segment 18. During step (140), the method then moves the extracted film segment 18 using the fifth driver assembly 74 so it is substantially adjacent to the magnetic writer 76 for magnetically writing and/or encoding the received data on the magnetic region 52 of the film segment 18.

In step (142), the method then determines whether the film segment 18 needs a new slide mount, which may be determined through visual inspection by an operator, or through automated visual classification techniques known in the art, such as trained neural networks or artificial intelligence-based routines, as described above. If a new slide mount is to be used, as determined in step (142), the extracted film segment 18, being unmounted, is then transferred by the fifth driver assembly 74 to a slide film mounter 78 for mounting the film segment 18 in step (144) into a second slide mount 80.

The second slide mount 80 may be a brand new slide mount fed automatically by a slide mount feeder from a stack of empty slide mounts. If a new slide mount is not to be used, as determined in step (142), the film segment 18 is remounted in the first original slide mount 16 in step (146).

Once the film segment 18 is remounted in the second slide mount 80 as a second film slide 82, the method receives data from the logic and control computer 44 in step (148), and performs step (150) using such received data by causing the sixth driver assembly 84 to pass the second film slide 82 substantially near a magnetic writer 86 to write and/or encode data onto the magnetic region of the second slide mount 80, such as the magnetic region 20 shown in FIG. 4. Such data may be the same data as written to the magnetic region 52 of the film segment 18 by the magnetic writer 76. Alternatively, the logic and control computer 44 may write different or additional information to the magnetic region 20 of the second slide mount 80. In step (150), the method then causes the sixth driver assembly 84 to output the second film slide 82, for example, to the second film slide holder 88.

After each slide has data written thereto in step (150), the method determines in step (152) if there are any more slides in the first slide holder 12 to be handled. If so, the method loops back in step (154) to load a next slide from the first slide holder 12, and proceeds to perform step (98). However, if no more slides are present in the first slide holder 12, the method ends in step (156).

While the disclosed film segment printing system and method are particularly shown and described herein with reference to the preferred embodiments, it is to be understood that various modifications in form and detail may be made without departing from the scope and spirit of the present invention. For example, the system 10 may include a conveyor belt or other devices, used in conjunction with the driver assemblies 36, 38, 56, 64, 74, and 84, to progressively and sequentially move each film slide, slide mount, and film segment from station to station for handling, such as the extractor 46 and the optical printer 68.

In addition, the digital printer 70 may be cathode ray tube (CRT) printer, a thermal printer, an inkjet printer, a bubble jet printer, a laser printer, an electrophotographic printer, or any other type of digital printer.

The invention has been described in detail with particular reference to certain preferred embodiments thereof, but it will be understood that variations and modifications can be effected within the spirit and scope of the invention.

PARTS LIST 10 system
12 first slide holder
14 film slide
16 slide mount
18 film segment
20 region of magnetic material
22 extraction slot
24 locking aperture
26 additional slides
28 opening
30 slide feeder
32 plunger
34 first slide
36 first driver assembly
38 second driver assembly
40 first magnetic reader
42 input data bus
44 logic and control computer
46 film segment extractor
48 output data bus
50 perforations
52 magnetic region
54 fat bit predetermined region
56 third driver assembly
58 arrow
60 fat bit reader
62 second magnetic reader
64 fourth driver assembly
66 film scanner
68 optical printer
70 digital printer
72 output line
74 fifth driver assembly
76 magnetic writer
78 film mounter
80 second slide mount
82 second film slide
84 sixth driver assembly
86 magnetic writer
88 second film slide holder
90 second film slides
92 film slide loader
94 spring device
96 load slides
98 detect magnetic data on slide
100 read magnetic data
102 send read data to computer
104 move slide to extract film
106 detect for fat bit
108 read fat bit
110 send fat bit data to computer
112 move film pass magnetic read head
114 detect for magnetic data on film
116 read magnetic data from the film
118 send print data to computer
120 move film to scanner
122 scan film
124 send scan data to computer
126 determine whether to print digitally
128 receive digital data
130 print digitally
132 determine whether to print optically
134 receive optical data
136 print optically
138 receive data from computer
140 write new data on film
142 determine whether to remount on new slide mount
144 remount on new slide mount
146 remount on original slide mount
148 receive data from computer
150 write new data on slide mount
152 check for more slides
154 go to next slide
156 end method

What is claimed is:

1. A system for printing from a film slide, the film slide having a first slide mount and a film segment mounted therein, comprising:

a film extractor for extracting the film segment from the first slide mount;

a printer for printing an image based on image data stored on the extracted film segment;

a scanner for scanning the image data stored in the extracted film segment and for generating scanned image data therefrom; and wherein the printer prints the images from the scanned image data.

2. The system of claim 1 wherein at least one of the first slide mount and the film segment has a region of magnetic material for storing data thereon.

3. The system of claim 2 further comprising:

a film mounting device for mounting the extracted film segment on a second slide mount;

a magnetic reader for reading first data from the region of magnetic material; and a magnetic writer for writing second data to at least one of the film segment or the second slide mount, wherein the second slide mount is one of a new slide mount or the first slide mount.

4. The system of claim 3 wherein the magnetic writer writes the second data to the magnetic material disposed on the extracted film segment prior to the mounting of the extracted film segment in the second slide mount.

5. The system of claim 3 wherein the magnetic writer writes the second data to the magnetic material disposed on the second slide mount subsequent to the mounting of the extracted film segment in the second slide mount.

6. The system of claim 5 wherein both the slide mount and the film segment include a respective region of magnetic material; and wherein the first data and the second data are identical such that the data stored on the film segment is written to the slide mount.

7. The system of claim 1 wherein the image data includes data representing the color and density of the image data stored on the film segment; and wherein the printer optically prints the images from the scanned image data.

8. The system of claim 1 wherein the scanner includes a digitizer for generating digital data representing the image data stored on the film segment; and wherein the printer digitally prints the images from the digital data.

9. The system of claim 1 further comprising:

a reader for detecting and decoding an optically coded bit on the film segment.

10. An automated system for printing from a plurality of film slides, each film slide having a first slide mount and a film segment mounted therein, comprising:

a plurality of automated handling stations including:

a slide loading station for sequentially loading a first slide into a handling path;

an extractor station for extracting the respective film segment from the respective first slide mount of the first slide;

a scanner station for scanning image data from the film segment;

a printing station for printing an image from the scanned image data;

a mounting station for mounting the film segment into a second slide mount as a second slide; and a slide output station for stacking the second slide with a set of remounted slides; and a driver assembly for moving the first slide mount, the second slide mount, and the film segment sequentially along the handling path from station to station.

11. The automated system of claim 10 wherein the driver assembly includes plurality of automated driver assembly stations, each including a set of rollers mounted on respective axles for respectively engaging the first slide mount, the second slide mount, and the film segment.

12. The automated system of claim 10 further comprising:

at least one magnetic reader for reading data from a region of magnetic material disposed on at least one of the first slide mount and the film segment.

13. The automated system of claim 10 further comprising:

at least one magnetic writer for writing data to a region of magnetic material disposed on at least one of the second slide mount and the film segment.

14. The automated system of claim 10 wherein the printing station includes:

an optical printer for optically printing images from the film segment.

15. The automated system of claim 10 wherein the scanner station includes a digitizer for digitizing images on the film segment to generate digital data therefrom; and wherein the printing station includes a digital printer for digitally printing images from the digital data.

16. A method for automatically printing from a first film slide having a first slide mount and a film segment mounted therein, comprising the steps of:

extracting the film segment from the first slide mount of the first slide;

printing an image based on image data stored on the extracted film segment;

scanning the image data stored in the extracted film segment to generate scanned image data therefrom; and printing the images from the scanned image data.

17. The method of claim 16 further comprising, after the step of printing, the step of:

mounting the extracted film segment into a second slide mount.

18. The method of claim 16 wherein the step of scanning includes the step of generating the scanned image data representing the color and density of the image data stored on the film segment; and wherein the step of printing includes the step of optically printing the images from the scanned image data.

19. The method of claim 16 wherein the step of scanning includes the step of digitizing the image data to generate digital data representing the image data stored on the film segment; and wherein the step of printing includes the step of digitally printing the images from the digital data.

20. The method of claim 16, wherein the image data is magnetically stored on the film segment.

21. The method of claim 16, wherein the image data is magnetically stored on the first slide mount.

22. The method of claim 16, wherein the image data is optically coded data written on the film segment.

* * * * *